United States Patent
Zhang et al.

(10) Patent No.: US 12,301,490 B2
(45) Date of Patent: May 13, 2025

(54) SYSTEM AND METHOD FOR REFERENCE SIGNALING CONFIGURATION

(71) Applicant: ZTE CORPORATION, Guangdong (CN)

(72) Inventors: Nan Zhang, Shenzhen (CN); Jianwu Dou, Shenzhen (CN); Wei Cao, Shenzhen (CN); Linxi Hu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 762 days.

(21) Appl. No.: 17/483,341

(22) Filed: Sep. 23, 2021

(65) Prior Publication Data

US 2022/0014330 A1   Jan. 13, 2022

Related U.S. Application Data

(63) Continuation of application No. PCT/CN2019/080596, filed on Mar. 29, 2019.

(51) Int. Cl.
*H04L 5/00* (2006.01)
*H04W 72/04* (2023.01)
*H04W 72/12* (2023.01)
*H04W 72/23* (2023.01)

(52) U.S. Cl.
CPC .......... *H04L 5/0048* (2013.01); *H04L 5/0007* (2013.01); *H04W 72/04* (2013.01); *H04W 72/12* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2012/0275414 A1* | 11/2012 | Hu | H04B 7/0452 370/329 |
| 2015/0098369 A1* | 4/2015 | Song | H04L 5/005 370/280 |

(Continued)

FOREIGN PATENT DOCUMENTS

| | | |
|---|---|---|
| CN | 102036301 A | 4/2011 |
| CN | 102461052 A | 5/2012 |

(Continued)

OTHER PUBLICATIONS

First Office Action for CN Appl. No. 201980095059.4, dated Jul. 12, 2022 (25 pages, with English translation).

(Continued)

*Primary Examiner* — Bob A Phunkulh
(74) *Attorney, Agent, or Firm* — Foley & Lardner LLP

(57) ABSTRACT

A system and method of identifying patterns on a resource grid, corresponding to resources that are allocated for a plurality of reference signals according to a set of pattern-based parameters. The system and method include identifying a set of resource-location-based parameters to define respective locations of a plurality of regions relative to each other on the resource grid, each region including a respective subset of the patterns. The system and method include configuring, to a receiving device, the set of pattern-based parameters and the set of resource-location-based parameters to schedule for the plurality of reference signals.

19 Claims, 15 Drawing Sheets

(56) References Cited

U.S. PATENT DOCUMENTS

| | | | |
|---|---|---|---|
| 2015/0282124 A1* | 10/2015 | Miao | H04L 25/0224 |
| | | | 455/450 |
| 2017/0019813 A1* | 1/2017 | Kim | H04W 74/0825 |
| 2018/0026684 A1* | 1/2018 | Wei | H04L 5/0007 |
| | | | 370/329 |
| 2018/0041323 A1 | 2/2018 | Wang et al. | |
| 2018/0278395 A1* | 9/2018 | Yoon | H04L 5/0051 |
| 2019/0044679 A1* | 2/2019 | Manolakos | H04L 5/0051 |
| 2019/0273544 A1* | 9/2019 | Cha | H04L 5/0091 |
| 2019/0349159 A1* | 11/2019 | Nammi | H04L 1/0071 |
| 2020/0396047 A1* | 12/2020 | Gao | H04L 5/10 |
| 2021/0160025 A1* | 5/2021 | Gao | H04L 5/0094 |
| 2021/0337548 A1* | 10/2021 | Gao | H04W 72/23 |
| 2022/0311574 A1* | 9/2022 | Gao | H04L 5/0051 |

FOREIGN PATENT DOCUMENTS

| | | |
|---|---|---|
| CN | 103944685 A | 7/2014 |
| CN | 108023720 A | 5/2018 |
| EP | 2 395 721 A2 | 12/2011 |
| KR | 10-2018-0134768 A | 12/2018 |
| WO | WO-2015/101150 A1 | 7/2015 |
| WO | WO-2017/056020 A1 | 4/2017 |
| WO | WO-2018/226039 A2 | 12/2018 |

OTHER PUBLICATIONS

LG Electronics, "Discussion on rate matching for PDSC/PUSCH" 3GPP TSG RAN WG1 Meeting 90bis, R1-1717974, Oct. 13, 2017, Prague, CZ (11 pages).

Extended European Search Report for EP Appl. No 19922833.9, dated Mar. 21, 2022 (8 pages).

"Discussion on RS for phase tracking", ZTE Corporation, 3GPP TSG RAN WG1 Meeting #89, R1-1707132, May 19, 2017 (11 pages).

International Search Report and Written Opinion of the International Searching Authority on PCT/CN2019/080596 dated Dec. 31, 2019.

Huawei et al., "TP for resource block and resource block grid for wideband operation", 3GPP TSG RAN WG1 Ad Hoc Meeting, R1-1800812, Jan. 26, 2018, Vancouver, Canada (8 pages).

Office Action for KR Appl. No. 10-2021-7034487, dated Jul. 25, 2024 (with English translation, 7 pages).

* cited by examiner

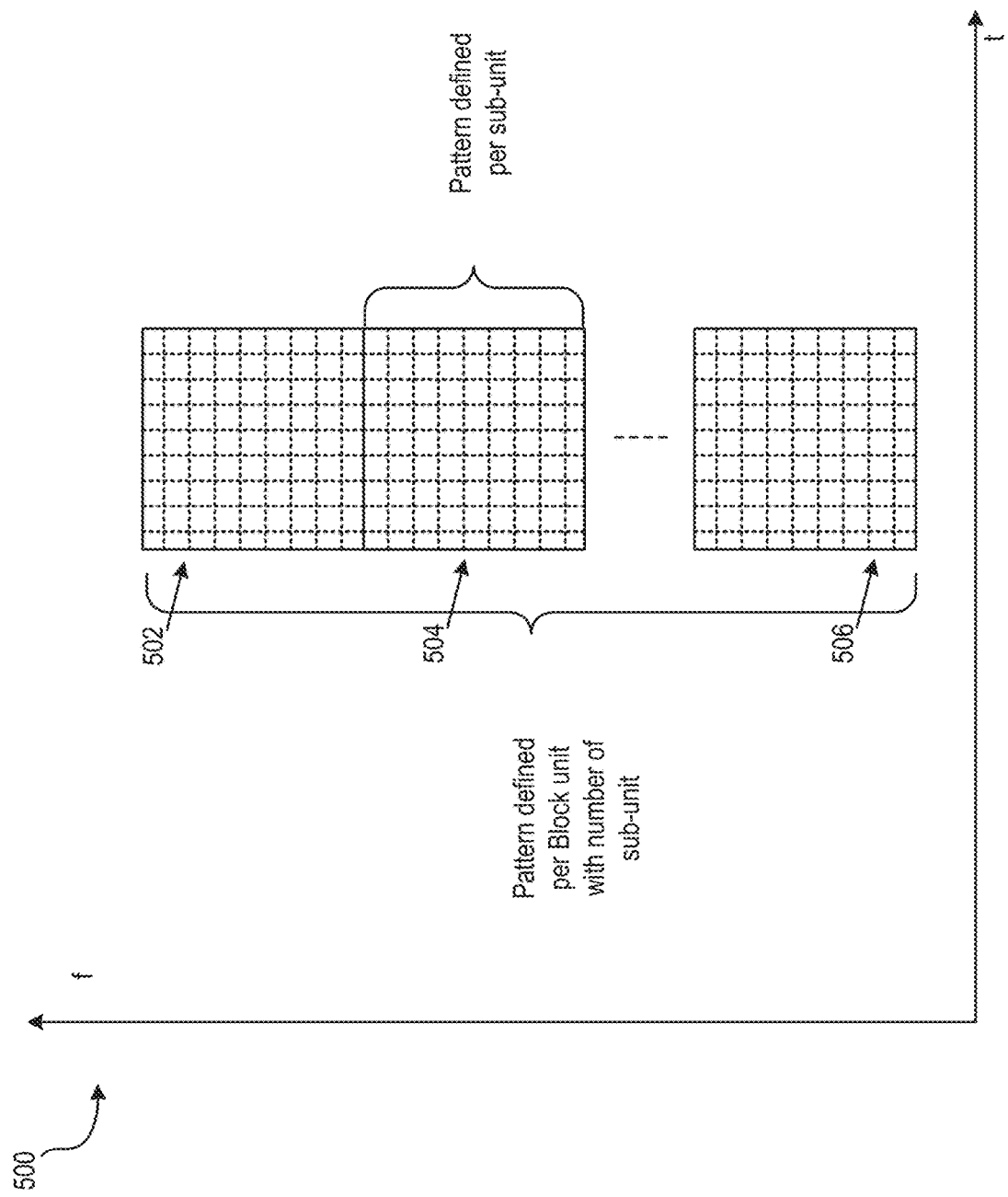

SYSTEM AND METHOD FOR REFERENCE SIGNALING CONFIGURATION

CROSS-REFERENCE TO RELATED APPLICATION

This application claims the benefit of priority under 35 U.S.C. § 120 as a continuation of PCT Patent Application No. PCT/CN2019/080596, filed on Mar. 29, 2019, the disclosure of which is incorporated herein by reference in its entirety.

TECHNICAL FIELD

The disclosure relates generally to wireless communications and, more particularly, to systems and methods for reference signal (RS) configuration.

BACKGROUND

To allow for coherent demodulation at a receiver, reference signals (RS) are inserted into an Orthogonal Frequency Division Multiplexed (OFDM) time-frequency resource grid to allow for carrier offset estimation, channel estimation, and timing synchronization. The reference signals occupy specified Resource Elements (REs) within the OFDM signal based on a reference signal design.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication node includes identifying, by a transmission node, patterns on a resource grid, corresponding to resources that are allocated for a plurality of reference signals according to a set of pattern-based parameters. In some embodiments, the method includes identifying, by the transmission node, a set of resource-location-based parameters to define respective locations of a plurality of regions relative to each other on the resource grid, each region including a respective subset of the patterns. In some embodiments, the method includes configuring, to a receiving device, the set of pattern-based parameters and the set of resource-location-based parameters to schedule for the plurality of reference signals.

In another embodiment, a wireless communications apparatus comprising a processor and a memory, wherein the processor is configured to read code from the memory and implement a method including identifying, by a transmission node, patterns on a resource grid, corresponding to resources that are allocated for a plurality of reference signals according to a set of pattern-based parameters. In some embodiments, the processor is configured to read code from the memory and implement a method including identifying, by the transmission node, a set of resource-location-based parameters to define respective locations of a plurality of regions relative to each other on the resource grid, each region including a respective subset of the patterns. In some embodiments, the processor is configured to read code from the memory and implement a method including identifying, configuring, to a receiving device, the set of pattern-based parameters and the set of resource-location-based parameters to schedule for the plurality of reference signals.

In yet another embodiment, a computer program product comprising a computer-readable program medium code stored thereupon, the code, when executed by a processor, causing the processor to implement a method including identifying, by a transmission node, patterns on a resource grid, corresponding to resources that are allocated for a plurality of reference signals according to a set of pattern-based parameters. In some embodiments, a computer program product comprising a computer-readable program medium code stored thereupon, the code, when executed by a processor, causing the processor to implement a method including identifying, by the transmission node, a set of resource-location-based parameters to define respective locations of a plurality of regions relative to each other on the resource grid, each region including a respective subset of the patterns. In some embodiments, a computer program product comprising a computer-readable program medium code stored thereupon, the code, when executed by a processor, causing the processor to implement a method including identifying configuring, to a receiving device, the set of pattern-based parameters and the set of resource-location-based parameters to schedule for the plurality of reference signals.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 5 is an example time-frequency resource grid 500 depicting an RS block unit consisting of a plurality of RS sub-units, in accordance with some embodiments of the present disclosure.

DETAILED DESCRIPTION OF EXEMPLARY EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 3:
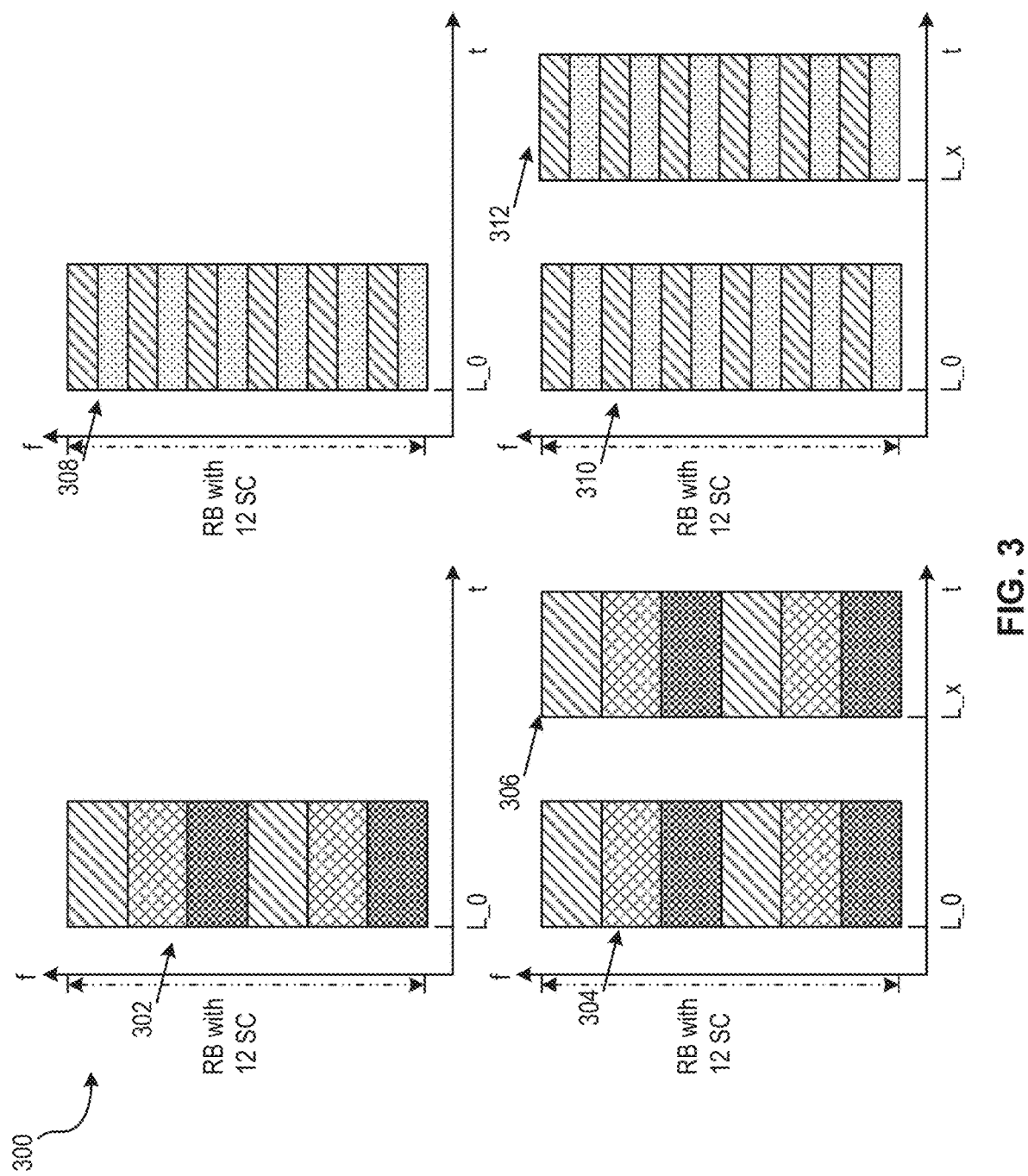
FIG. 3 are example time-frequency resource grids 300 each depicting reference signal (RS) patterns allocated per scheduling unit consecutively, in accordance with some embodiments of the present disclosure.

In conventional systems, the RS design (e.g., Demodulation Reference Signal or DM-RS) mainly targets the transmission scenarios with significant frequency selectivity, together with the configurable RS density in the time domain for different user equipment (UE) speed assumptions. More specifically, within the scheduled bandwidth (also referred to herein as, "scheduling bandwidth"), the reference signal is allocated per scheduling unit consecutively (i.e., RB in existing spec), as shown in FIG. 3. However, with the introduction of new applications and use cases—such as non-terrestrial (NTN) and Internet of Things (IoT) transmission short scheduling duration, as well as, a transition of user equipment status (e.g., high speed vs lower speed)—the RS design in the conventional system fails to provide enough flexible for reducing the overhead of the reference signal and/or increasing the reference signal capacity.

According, the systems and methods discussed herein allow for non-consecutive DM-RS allocation patterns within the scheduling bandwidth, as well as dynamic selection of DM-RS patterns; thereby allowing for reductions in network latency, network congestion, and the consumption of vital networking bandwidth.

In general, one or more wireless communication nodes (depicted in FIG. 1 as, BS 102) may define a reference signal (RS) block unit based on a set of resource-location-based-parameters. The one or more wireless communication devices (depicted in FIG. 1 as, UE 104) may then communicate with the one or more wireless communication nodes by using the defined RS block unit. For example, the telecommunication environment includes one or more wireless communication nodes, such as a base station, in communication with one or more wireless communication devices ("receiving device"), such as a mobile phone or user equipment, via a wireless communication network. The base station may identify patterns on a resource grid, corresponding to resources (e.g., resource elements) that are allocated for a plurality of reference signals according to a set of pattern-based parameters, such as a code division multiplexing (CDM) group, an orthogonal cover code (OCC) in a time domain used for CDM, an OCC in a frequency domain used for CDM, and a cyclic shift (CS) used for CDM, a resource signal (RS)-type.

The base station may identify a set of resource-location-based parameters (as discussed below) to define respective locations of a plurality of regions, or RS regions, relative to each other on the resource grid, each region including a respective subset of the patterns.

In response to identifying the set of resource-location-based parameters, the base station may configure (e.g., send, transmit, provide, deliver), to a wireless communication device, the set of pattern-based parameters and the set of resource-location-based parameters to schedule for the plurality of reference signals.

As another example, the mobile phone (e.g., wireless communication device) may identify patterns on a resource grid, corresponding to resources that are allocated for a plurality of reference signals according to a set of pattern-based parameters. The mobile phone may identify a set of resource-location-based parameters to define respective locations of a plurality of regions relative to each other on the resource grid, each region including a respective subset of the patterns. In response to identifying the set of resource-location-based parameters, the mobile phone may configure (e.g., send, transmit, provide, deliver), to the base station, the set of pattern-based parameters and the set of resource-location-based parameters to schedule for the plurality of reference signals.

As discussed below, the base station and/or mobile phone may define a reference signal (RS) block unit based on any number/type of resource-location-based parameters, as discussed herein.

Furthermore, the one or more wireless communication nodes (or the one or more wireless communication devices) may flexibly construct an RS region, or configure the resource allocation, based on discrete RS allocation, the duration of each allocated resource, and/or the length of scheduling units (e.g., one or more Resource Blocks (RB), or a number of RS block units as defined herein).

Mobile Communication Technology and Environment

Figure 1:
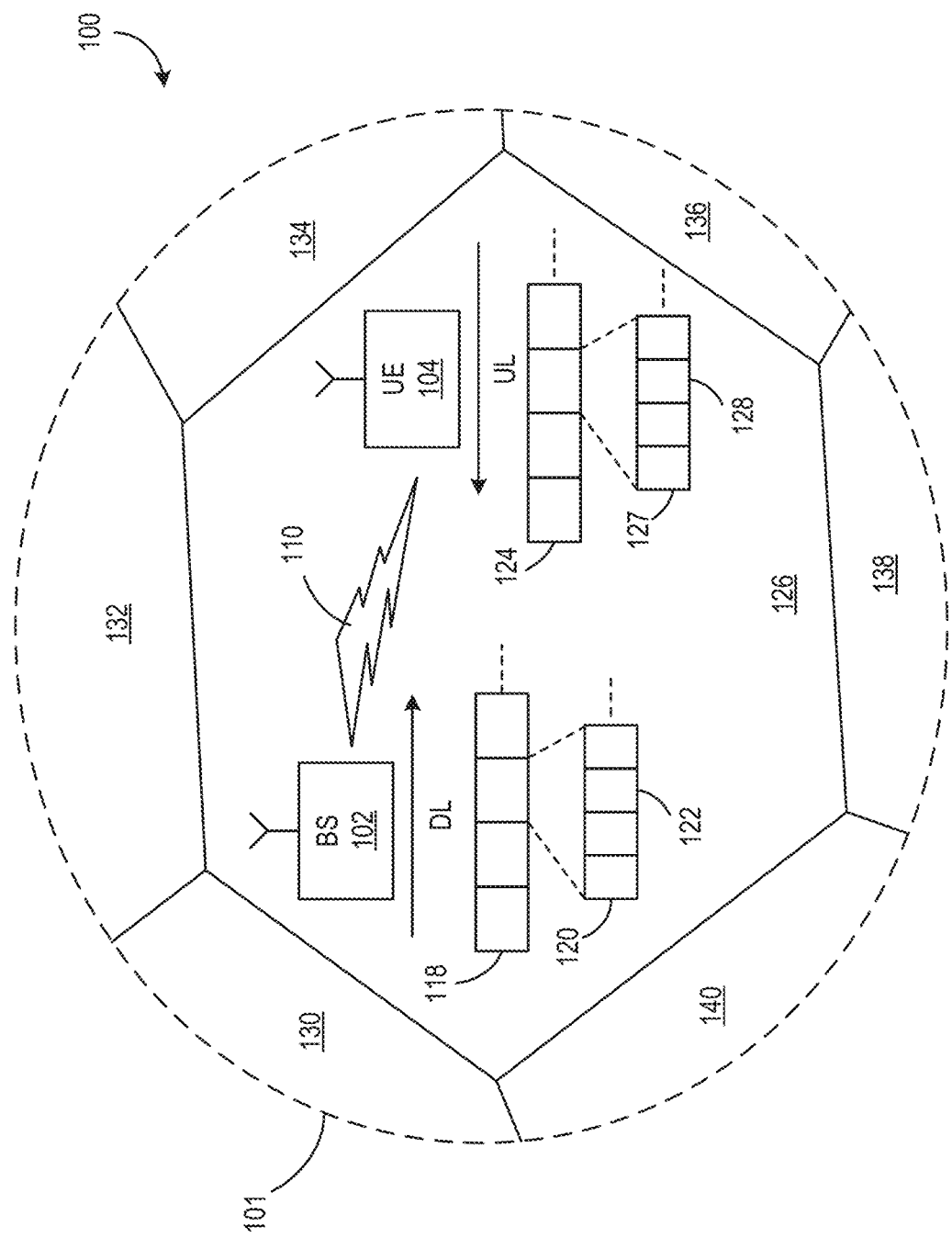
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
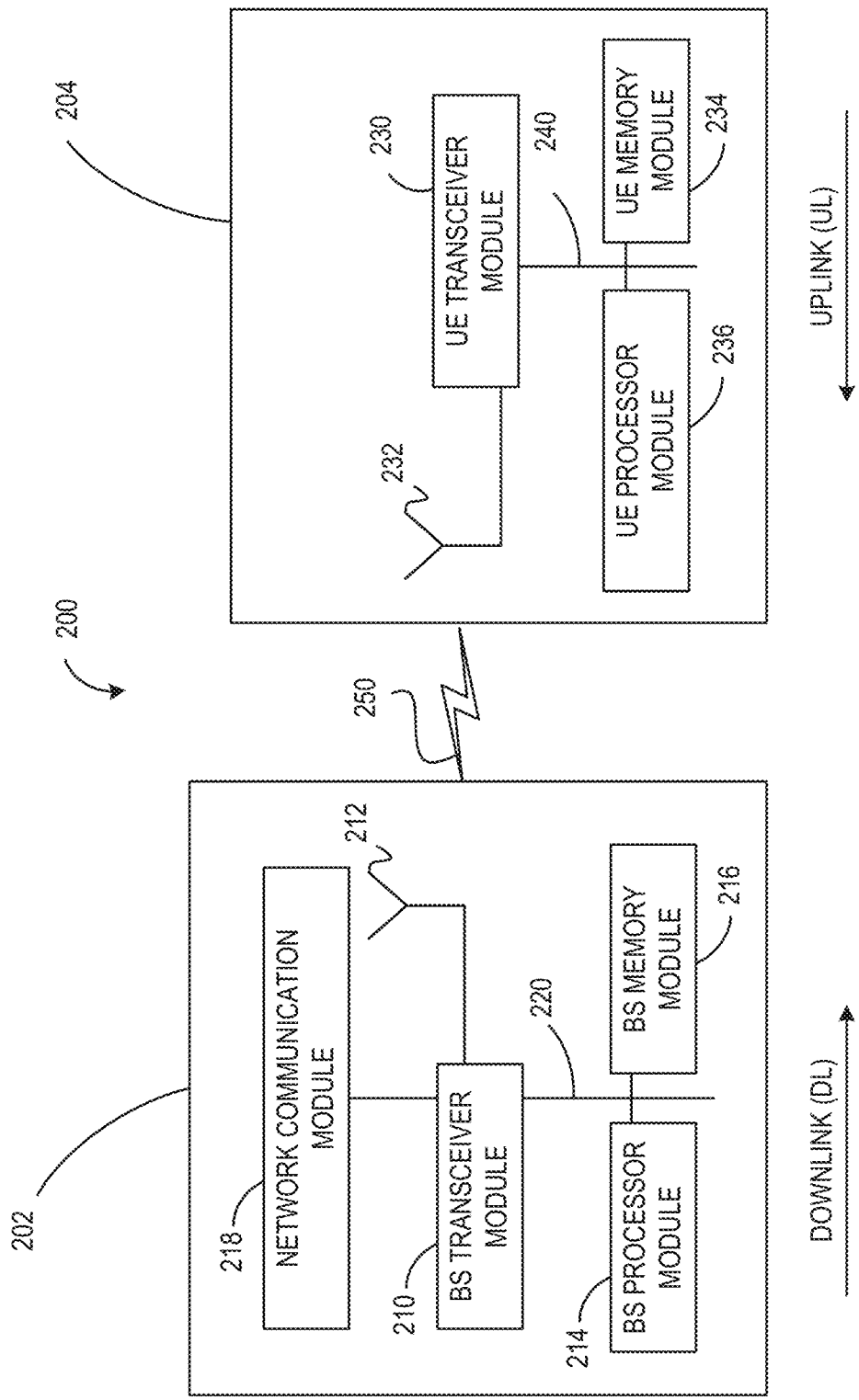
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Defining a Reference Signal (RS) Block Unit

FIG. 3 include example time-frequency resource grids 300 each depicting reference signal (RS) patterns allocated per scheduling unit consecutively, in accordance with some embodiments of the present disclosure. As shown, the time-frequency resource grids 300 include a set of RS patterns 302, a set of RS patterns 304, a set of RS patterns 306, a set of RS patterns 308, a set of RS patterns 310, and a set of RS patterns 312. The parameters used to define the pattern (e.g., DM-RS-type, number of front loaded DM-RS, number of additional DM-RS) are configured by the higher layer signaling. The supported number of DM-RS ports is also determined by code division multiplexing (CDM) groups by the introduction of either an orthogonal cover code (OCC) in time-frequency (T/F) or a cyclic shift (CS) shift. The capacity for current DM-RS design is to support 8 and 12 ports for DM-RS type 1 and 2, respectively.

Figure 4:
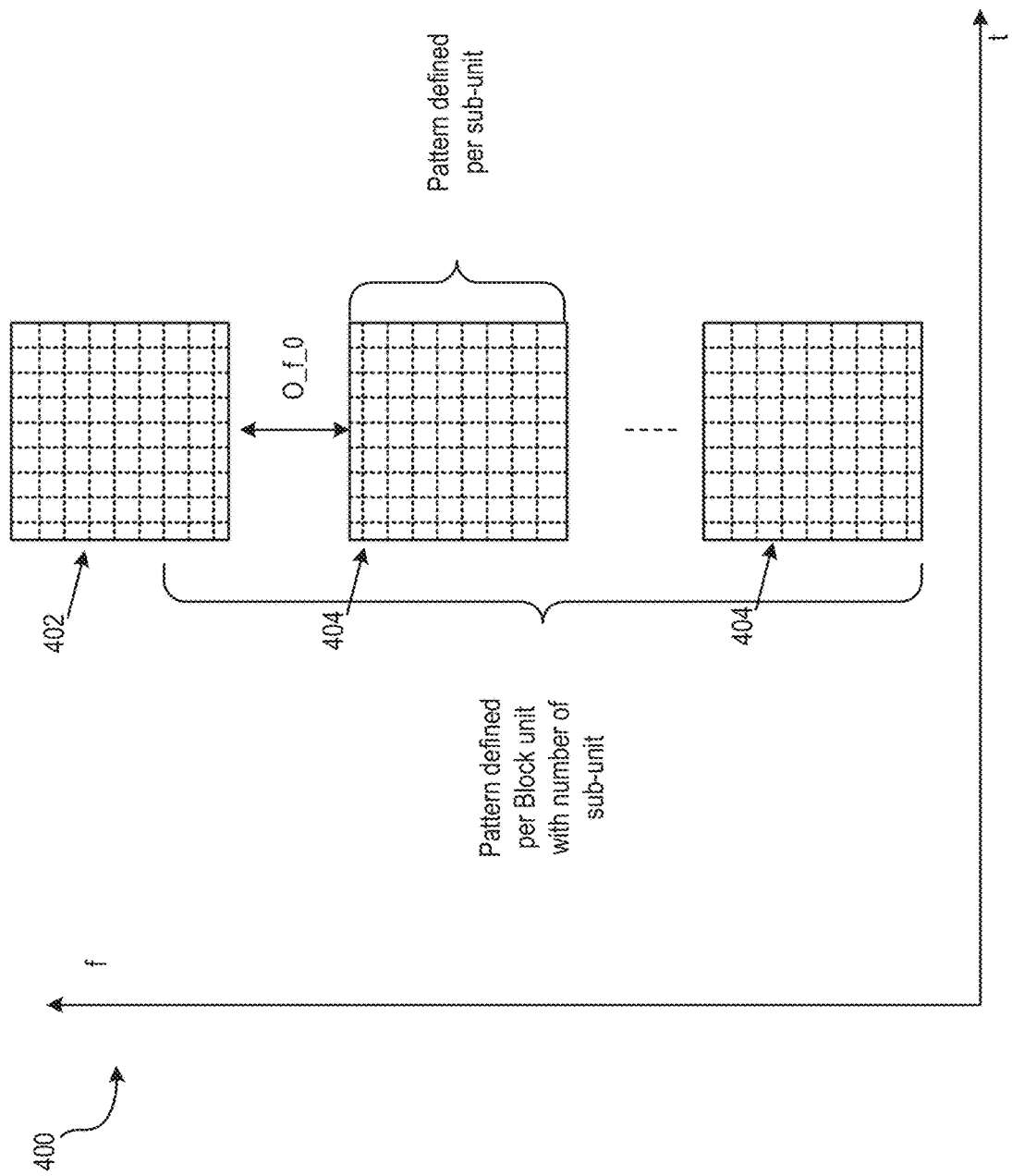
FIG. 4 is an example time-frequency resource grid 400 depicting an RS block unit consisting of a plurality of RS sub-units, according to an illustrative embodiment.

FIG. 4 is an example time-frequency resource grid 400 depicting an RS block unit consisting of a plurality of RS sub-units, according to an illustrative embodiment. As shown, the RS block unit (also referred to herein as "a region") includes RS sub-unit 402, RS sub-unit 404, and RS sub-unit 406 (collectively referred to as, "RS sub-unit 402-406"). Each RS sub-unit 402-406 is depicted on the time-frequency resource grid 400 as non-consecutive RS sub-units. In some embodiments, each RS sub-unit 402-406 can include or correspond to an RS pattern. For example, a non-consecutive RS sub-unit is separated by an offset (O_f_0) in the frequency domain such that the non-consecutive RS sub-unit is neither adjacent to other RS sub-units, nor overlapping any other RS sub-units. While only three RS sub-units are shown, an RS block unit may include any number of non-consecutive RS sub-units that are separated from one another by an offset (O_f_0) in the frequency domain.

FIG. 5 is an example time-frequency resource grid 500 depicting an RS block unit consisting of a plurality of RS sub-units, in accordance with some embodiments of the present disclosure. As shown, the RS block unit (also referred to herein as "a region") includes RS sub-unit 502, RS sub-unit 504, and RS sub-unit 506 (collectively referred to as, "RS sub-unit 502-506"). Each RS sub-unit 502-506 is depicted on the time-frequency resource grid 500 as consecutive RS sub-units. In some embodiments, each RS sub-unit 502-506 can include or correspond to an RS pattern. For example, an RS sub-unit is a consecutive RS sub-unit if it is adjacent to (or abutting) another RS sub-unit in the frequency domain. That is, RS sub-unit 502 and RS sub-unit 504 are consecutive RS sub-units because they are positioned in the resource grid adjacent to one another, such that there is no offset (O_f_0) in the frequency domain between one another. While only three RS sub-units 502-506 are shown, an RS block unit may include any number of consecutive RS sub-units.

As discussed above, a transmission node (e.g., BS 102 or UE 104) may define, configure, or otherwise identify a reference signal (RS) block unit based on a set of pattern-based parameters and a set of resource-location-based-parameters. For example, the transmission node may identify patterns on a resource grid, corresponding to resources (e.g., resource elements) that are allocated for a plurality of reference signals according to a set of pattern-based parameters. The transmission node may identify a set of resource-location-based parameters to define respective locations of a plurality of regions relative to each other on the resource grid, each region including a respective subset of the patterns. In response to identifying the set of resource-location-based parameters, the transmission node may configure (e.g., send, transmit, provide, deliver), to a receiving device, the set of pattern-based parameters and the set of resource-location-based parameters to schedule for the plurality of reference signals.

The transmission node may configure the set of pattern-based parameters and the set of resource-location-based parameters by merging (combining) both sets of parameters into a single parameter set, and configure, to a receiving device, the single parameter set to schedule for the plurality of reference signals. In some embodiments, the transmission node may configure the set of pattern-based parameters and the set of resource-location-based parameters, separately. For example, the transmission node may configure the set of pattern-based parameters before configuring the set of resource-location-based parameters. As another example, the transmission node may configure the set of resource-location-based parameters before configuring the set of pattern-based parameters. In some embodiments, the transmission node may configure the set of pattern-based parameters and the set of resource-location-based parameters, jointly (i.e., simultaneously, substantially simultaneously, concurrently, in-parallel, or substantially in-parallel). In some embodiments, the transmission node may configure, to the receiving device, the resources allocated for the plurality of reference signals via referring to a predefined data structure (e.g., a look-up table) that includes a number of RS patterns. The transmission node may identify one or more of the RS patterns by indicating a resource signal (RS)-type. As such, the transmission node may only configure the set of resource-location-based parameters, to the receiving device, to schedule for the plurality of reference signals.

The set of pattern-based parameters may include at least one of: a number of code division multiplexing (CDM) groups, an orthogonal cover code (OCC) in a time domain used for CDM, an OCC in a frequency domain used for CDM, and a cyclic shift (CS) used for CDM, and a resource signal (RS)-type.

In some embodiments, the transmission node (e.g., BS 102 or UE 104) may define a reference signal (RS) block unit based on a set of resource-location-based parameters that may include at least one of: Number of sub-unit (N) and an offset between two adjacent sub-unit of RS in frequency domain (O_f_0). For example, the transmission node may determine that the time domain distribution is already included in the sub-unit definition. In response to the determination, the transmission node may identify a plurality of reference signal sub-units (e.g., RS sub-unit) on the resource grid, each of which includes one of the patterns. The transmission node may define each of the plurality of regions to include the plurality of reference signal sub-units based on a number of the reference signal sub-units and/or an offset (e.g., O_f_0) between two adjacent ones of the reference signal sub-units along a frequency domain of the resource grid. The transmission node may identify the number of the reference signal sub-units (e.g., N) and/or the offset between two adjacent ones of the reference signal sub-units along the frequency domain of the resource grid as the set of resource-location-based parameters.

In some embodiments, if the RS block unit is the same as a scheduling unit (e.g., a resource block (RB)) or consist of single sub-unit, the transmission node may define the regions using neither the parameter N nor O_f_0. For example, the transmission node may determine that the RS block unit substantially matches one or more of the RB. In response to determining the match, the transmission node may not configure the regions to the receiving device using either parameter N or O_f_0.

In some embodiments, the transmission node (e.g., BS 102 or UE 104) may define a reference signal (RS) block unit based on a set of resource-location-based parameters that only includes a single parameter, such as Number of sub-unit (N). For example, the transmission node may determine that an RS block unit consists of one or more consecutive RS sub-units (e.g., RS sub-unit 502 and RS sub-unit 504 in FIG. 5). In response to the determination, the transmission node may identify one or more reference signal sub-units on the resource grid, each of the one or more reference signal sub-units includes one of the patterns. The transmission node may define each of the plurality of regions to include the one or more reference signal sub-units based on determining whether a number of the one or more reference signal sub-units is one or whether the one or more reference signal sub-units are consecutive (e.g., abutting or continuous) along the frequency domain of the resource grid. The transmission node may identify, based on the determination, the number of the reference signal sub-units as the set of resource-location-based parameters.

In some embodiments, if the RS block unit is the same as a scheduling unit (e.g., a resource block (RB)) or consist of a single sub-unit, the transmission node may not define the regions using the parameter N. For example, the transmission node may determine that the RS block unit substantially matches one or more of the RB. In response to determining the match, the transmission node may not configure, define and/or describe the regions to the receiving device using the parameter N.

In some embodiments, the transmission node (e.g., BS 102 or UE 104) may define a reference signal (RS) block unit based on a set of resource-location-based parameters that may include at least one of: Number of sub-unit in frequency domain (N_f), Number of sub-unit in time domain (N_t), offset between two adjacent sub unit in frequency domain (O_f_0), or location(s) of sub-unit in time domain (L_t) (e.g., symbol or slot index). For example, the transmission node may determine that the time domain distribution is not included in the sub-unit definition. In response to the determination, the transmission node may identify a plurality of reference signal sub-units on the resource grid, each of which includes one of the patterns. The transmission node may define each of the plurality of regions to include the plurality of reference signal sub-units based on a number of the reference signal sub-units along a frequency domain of the resource grid, a number of the reference signal sub-units along a time domain of the resource grid, an offset between two adjacent ones of the reference signal sub-units along the frequency domain of the resource grid, and/or respective locations of the reference signal sub-units along the time domain of the resource grid. The transmission node may identify the number of the reference signal sub-units along the frequency domain of the resource grid, the number of the reference signal sub-units along the time domain of the resource grid, the offset between two adjacent ones of the reference signal sub-units along the frequency domain of the resource grid, and/or the respective locations of the reference signal sub-units along the time domain of the resource grid as the set of resource-location-based parameters.

In some embodiments, the transmission node (e.g., BS 102 or UE 104) may define a reference signal (RS) block unit based on a set of resource-location-based parameters that may include at least one of: Number of sub-unit in frequency domain (N_f), Number of sub-unit in time domain (N_t), and location(s) of sub-unit in time domain (L_t) (e.g., symbol or slot index). For example, the transmission node may determine that the time domain distribution is not included in the sub-unit definition. The transmission node may also determine that the RS block unit consists of one or more consecutive RS sub-units (e.g., RS sub-unit 502 and RS sub-unit 504 in FIG. 5). In response to one or more of the determinations, the transmission node may identify a plurality of reference signal sub-units on the resource grid, each of which includes one of the patterns. The plurality of reference signal sub-units may be consecutive along the frequency domain of the resource grid. The transmission node may define each of the plurality of regions to include the plurality of reference signal sub-units based on a number of the reference signal sub-units along a frequency domain of the resource grid, a number of the reference signal sub-units along a time domain of the resource grid, an offset between two adjacent ones of the reference signal sub-units along the frequency domain of the resource grid, and/or respective locations of the reference signal sub-units along the time domain of the resource grid. The transmission node may identify the number of the reference signal sub-units along the frequency domain of the resource grid, the number of the reference signal sub-units along the time domain of the resource grid, the offset between two adjacent ones of the reference signal sub-units along the frequency domain of the resource grid, the respective locations of the reference signal sub-units along the time domain of the resource grid as the set of resource-location-based parameters, and/or the respective locations of the reference signal sub-units along the time domain of the resource grid as the set of resource-location-based parameters.

Defining a Reference Signal (RS) Region by Resource-Location-Based Parameters

Figure 6A:
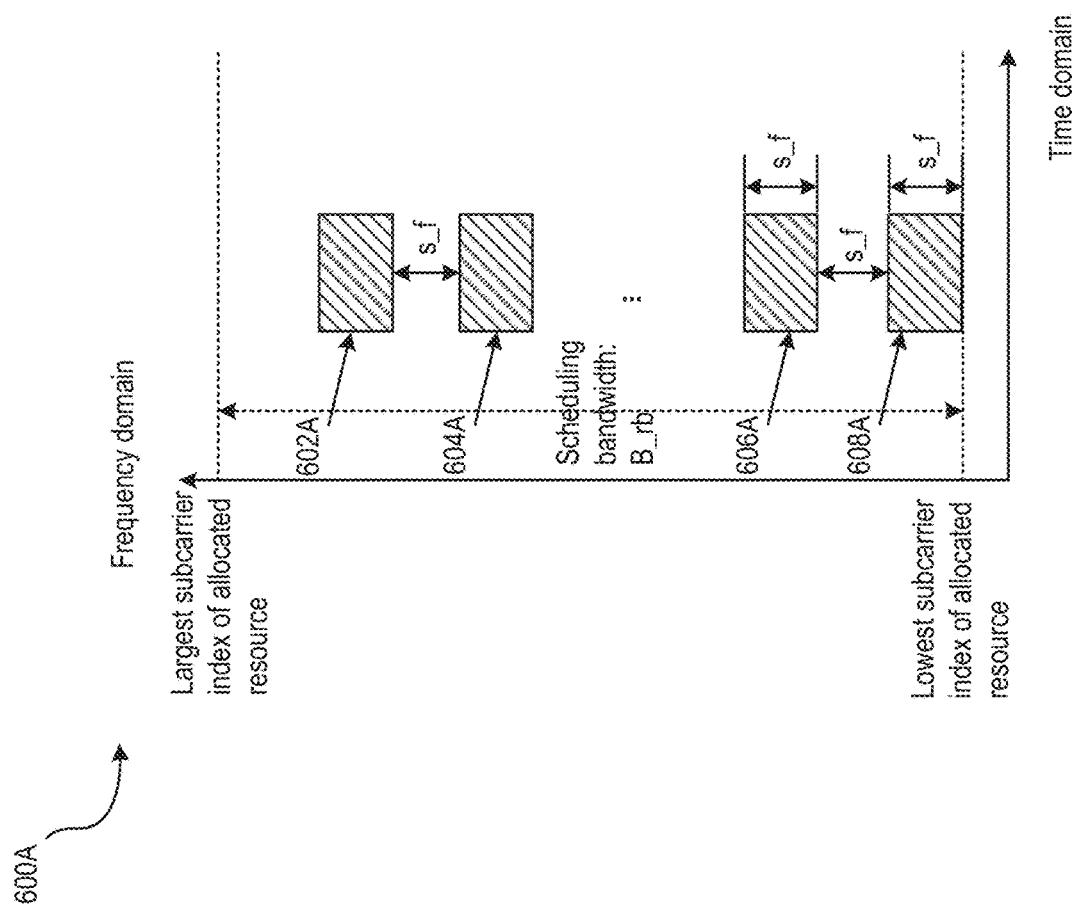
FIG. 6A is an example time-frequency resource grid 600A depicting reference signal (RS) patterns consisting of a plurality of RS block units, in accordance with some embodiments of the present disclosure.

FIG. 6A is an example time-frequency resource grid 600A depicting reference signal (RS) patterns consisting of a plurality of RS block units (also referred to herein as, "a scheduling unit" and/or "a region"), in accordance with some embodiments of the present disclosure. The time-frequency resource grid 600A includes RS block unit 602A, RS block unit 604A, RS block unit 606A, and RS block unit 608A (collectively referred to as, "RS block unit 602A-608A"). Each RS block unit 602A-608A includes a respective subset of the RS patterns. The time-frequency resource grid 600A depicts the relationship between the resource-location-based parameter, Granularity (S_f (S_f>=1)), and each RS block unit 602A-608A. That is, the scheduled bandwidth is split into several sub-regions, such that each RS block unit may be allocated into one sub_region having a length S_f and a gap of S_f.

For example, the basic RS pattern (k), as a function of (i.e., based on, derived from, calculated from, etc.) the aforementioned pattern-based parameter(s), may be defined by the following equation:

$$k = \begin{cases} 4n + 2k' + \Delta, & Type1 \\ 6n + k' + \Delta, & Type2 \end{cases} ; \quad \text{Equation 1}$$

where $\Delta$ is determined by the predefined table with the corresponding CDM value, k'=0, 1 and n=0, 1 ... and Type-1/2 refers to the selected RS type.

The allocation of the resource for RS transmission, as a function of (i.e., based on, derived from, calculated from, etc.) the aforementioned resource-based parameters (e.g., Granularity (S_f (S_f>=1)); also referred to herein as $S_f$) may be described by either of the following two options:

$$n = \theta + W*2*S_f + Z \quad \text{Option 1:}$$

where, W=0, 2, 4, 6 ... or 1, 3, 5, 8, ... and Z={0, 1, ... 2*$S_f$−1}.

$$n = \theta + W*S_f + Z \quad \text{Option 2:}$$

where, W=0, 4, 8, 12 ... or 2, 6, 10, 14, ... and Z={0, 1, ... 2*$S_f$−1}.

Moreover, if the indexed of RB within RS is within the scheduled bandwidth, no $\theta$ is presented in Option 1 or Option 2, as defined above. Otherwise, $\theta$ is a function of starter of scheduled bandwidth.

Still referring to FIG. 6A, in some embodiments, the transmission node (e.g., BS 102 or UE 104) may determine the RS pattern design, or configure the resource allocation, based on a set of resource-location-based parameters that only includes a single parameter, such as Granularity, S_f (S_f>=1). For example, the transmission node may identify a granularity factor as the set of resource-location-based parameters. In some embodiments, the identified granularity factor may be equal to a length of each of the regions along a frequency domain of the resource grid. In some embodiments, the identified granularity factor is equal to a distance between adjacent ones of the regions along the frequency domain of the resource grid.

Figure 6B:
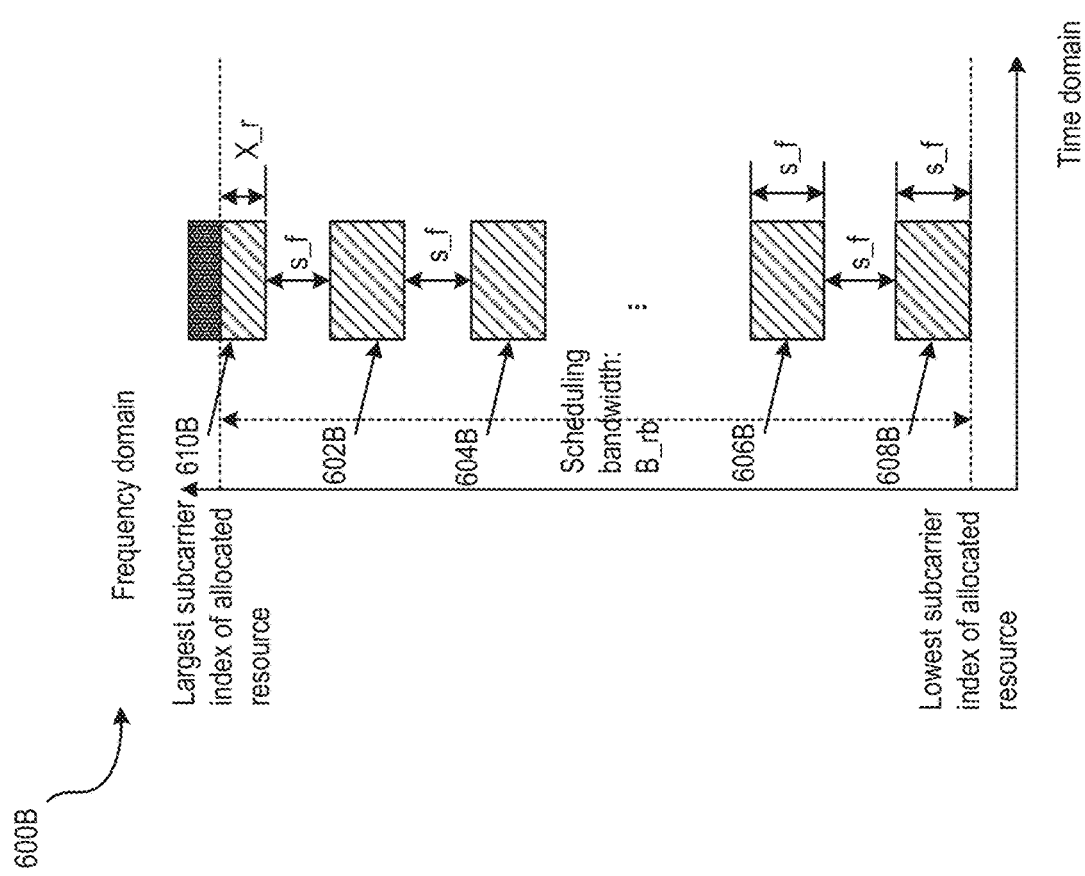
FIG. 6B is an example time-frequency resource grid 600B depicting reference signal (RS) patterns consisting of a plurality of RS block units, in accordance with some embodiments of the present disclosure.

FIG. 6B includes an example time-frequency resource grid 600B depicting reference signal (RS) patterns consisting of a plurality of RS block units (also referred to herein as, "a scheduling unit" and/or "a region"), in accordance with some embodiments of the present disclosure. The time-frequency resource grid 600B includes RS block unit 602B, RS block unit 604B, RS block unit 606B, RS block unit 608B, and RS block unit 610B (collectively referred to as, "RS block unit 602B-610B"). Each RS block unit 602B-610B includes a respective subset of the RS patterns. The time-frequency resource grid 600B depicts the relationship between the resource-location-based parameter, Granularity (S_f (S_f>=1)), and each RS block unit 602B-610B. That is, the scheduled bandwidth is split into several sub-regions, such that each RS block unit may be allocated into one sub_region having a length S_f and a gap of S_f. The time-frequency resource grid 600B also depicts the length of fractional RS (X_r), which is the result of the final RS allocation. In some embodiments, the transmission node may determine that the RS allocation based on the pattern exceeds the region of scheduling bandwidth for certain user equipment (UE). In response to the determination, the transmission node may only transmit the fraction of the unit with length (X_r) crossing the boundary.

Still referring to FIG. 6B, in some embodiments, the transmission node (e.g., BS 102 or UE 104) may determine the RS pattern design, or configure the resource allocation, based on a set of resource-location-based parameters that include at least one of: Granularity (S_f (S_f>=1)) or offset between the lowest frequency index and the starter of RS position (O_f_1). For example, the transmission node may identify a granularity factor as a first one of the set of resource-location-based parameters. In some embodiments, the granularity factor may be equal to a length of each of the regions along a frequency domain of the resource grid. In some embodiments, the granularity factor may be equal to a distance between adjacent ones of the regions along the frequency domain of the resource grid. The transmission node may identify an offset between a bottom boundary of a scheduling bandwidth and a starting location of the regions along the frequency domain of the resource grid as a second one of the set of resource-location-based parameters.

For example, the basic RS pattern (k), as a function of (i.e., based on, derived from, calculated from, etc.) the aforementioned pattern-based parameter(s), may be defined by the following equation:

$$k = \begin{cases} 4n + 2k' + \Delta, & Type1 \\ 6n + k' + \Delta, & Type2 \end{cases} ; \quad \text{Equation 2}$$

where the Δ is determined by the predefined table with the corresponding CDM value, k'=0, 1 and n=0, 1 . . . and Type-1/2 refers to the selected RS type.

The allocation of the resource for RS transmission, as a function of (i.e., based on, derived from, calculated from, etc.) the aforementioned resource-based parameters (e.g., offset between the lowest frequency index and the starter of RS position (O_f_1)) may be described by either of the following two options:

$$n=\theta+W*2*S_f+Z \quad \text{Option 1:}$$

where, W=0, 2, 4, 6 . . . or 1, 3, 5, 8, . . . and Z={0, 1, . . . 2*S_f−1}.

$$n=\theta+W*S_f+Z \quad \text{Option 2:}$$

where, W=0, 4, 8, 12 . . . or 2, 6, 10, 14, . . . and Z={0, 1, . . . 2*S_f−1}.

Moreover, if the indexed of RB within RS is within the scheduled bandwidth, θ is a function of offset between the lowest frequency index and the starter of RS position (O_f_1). Otherwise, θ is a joint function of starter of scheduled bandwidth and offset between the lowest frequency index and the starter of RS position (O_f_1).

In some embodiments, the transmission node (e.g., BS 102 or UE 104) may determine the RS pattern design, or configure the resource allocation, based on a set of resource-location-based parameters that may include at least one of: Granularity (S_f (S_f>=1)) and Bitmap to indicated the selected region with allocated RS. For example, the transmission node may identify a granularity factor as a first one of the set of resource-location-based parameters. In some embodiments, the granularity factor may be equal to a length of each of the regions along a frequency domain of the resource grid. In some embodiments, the granularity factor may be equal to a distance between adjacent ones of the regions along the frequency domain of the resource grid. The transmission node may divide, using the granularity factor, a scheduling bandwidth into a plurality of sections. The transmission node may generate a bitmap to indicate which of the sections is allocated for one of the reference signals. The transmission node may identify the bitmap as a second one of the set of resource-location-based parameters.

For example, the basic RS pattern (k), as a function of (i.e., based on, derived from, calculated from, etc.) the aforementioned pattern-based parameter(s), may be defined by the following equation, $$k = \begin{cases} 4n + 2k' + \Delta, \; Type1 \\ 6n + k' + \Delta, \; Type2 \end{cases} ; \quad \text{Equation 3}$$

where Δ is determined by the predefined table with the corresponding CDM value, k'=0, 1 and n=0, 1 . . . and Type-1/2 refers to the selected RS type.

The allocation of the resource for RS transmission, as a function of (i.e., based on, derived from, calculated from, etc.) the aforementioned resource-based parameters (e.g., offset between the lowest frequency index and the starter of RS position (O_f_1)) may be described as in following two options:

$$n=\theta+W*2*S_f+Z \quad \text{Option 1:}$$

where, W=0, 2, 4, 6 . . . or 1, 3, 5, 8, . . . and Z={0, 1, . . . 2*S_f−1}.

$$n=\theta+W*S_f+Z \quad \text{Option 2:}$$

where, W=0, 4, 8, 12 . . . or 2, 6, 10, 14, . . . and Z={0, 1, . . . 2*S_f−1}.

Moreover, W may be a function of Bitmap.

In some embodiments, the transmission node (e.g., BS 102 or UE 104) may determine the RS pattern design, or configure the resource allocation, based on a set of resource-location-based parameters that only include a single parameter, DownSampleFactor (D/F). That is, instead of directly selected the scheduled region with certain granularity, the down-sample of the RS design with introduction of DownSampleFactor (D_f) can be considered. In this way, the FDM-length or Comb number will be enlarged by either D_f (if 1<D_f) or 1/D_f (0<D_f<1). For example, the transmission node may identify patterns on a resource grid, corresponding to resources that are allocated for a plurality of reference signals according to a set of pattern-based parameters, where the set of pattern-based parameters can include a down sample factor configured to enlarge a number of resource units across which each of the patterns is distributed along a frequency domain of the resource grid.

For example, the basic RS pattern (k), as a function of (i.e., based on, derived from, calculated from, etc.) the aforementioned pattern-based parameter(s), may be defined by the following equation:

$$k = \begin{cases} 4n + 2k' + \Delta, \; Type1 \\ 6n + k' + \Delta, \; Type2 \end{cases} ; \quad \text{Equation 4}$$

where the Δ is determined by the predefined table with the corresponding CDM value, k'=0, 1 and n=0, 1 . . . and Type-1/2 refers to the selected RS type.

The allocation of the resource for RS transmission, as a function of (i.e., based on, derived from, calculated from, etc.) the aforementioned pattern-based parameters (e.g., DownSampleFactor (D/F)), may be described by either of the following two options:

Option 1: keep the value range of n, i.e., n=0, 1 . . . , but with following changed equation:

$$k = \begin{cases} 4n*D\_f + 2k' + \Delta, \; Type1 \\ 6n*D\_f + k' + \Delta, \; Type2 \end{cases}$$

Option 2: keep the function of k unchanged, but directly change the value range of n into n=0, D_f, 2*D_f, 3*D_f, . . . .

Figure 7A:
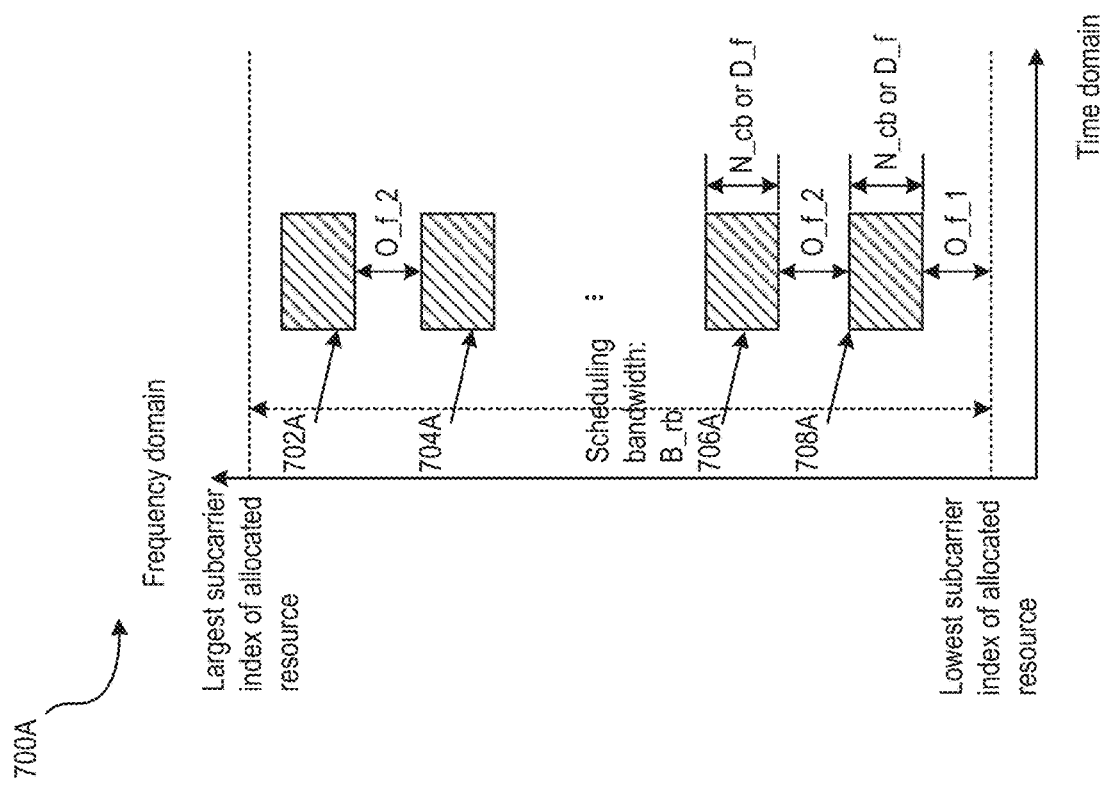
FIG. 7A is an example time-frequency resource grid 700A depicting reference signal (RS) patterns consisting of a plurality of RS block units, in accordance with some embodiments of the present disclosure.

FIG. 7A includes an example time-frequency resource grid 700A depicting reference signal (RS) patterns consisting of a plurality of RS block units (also referred to herein as, "a scheduling unit" and/or "a region"), in accordance with some embodiments of the present disclosure. The time-frequency resource grid 700A includes RS block unit 702A, RS block unit 704A, RS block unit 706A, and RS block unit 708A (collectively referred to as, "RS block unit 702A-708A"). Each RS block unit 702A-708A includes a respective subset of the RS patterns. The time-frequency resource grid 700A depicts the relationship between resource-location-based parameters, such as an offset between the lowest frequency index and the starter of RS position (O_f_1), an offset between two discrete RS block unit (O_f_2), DownSampleFactor (D_f), and the number of consecutive RS block unit (N_cb); and each RS block unit 702A-708A.

Still referring to FIG. 7A, in some embodiments, the transmission node (e.g., BS 102 or UE 104) may determine the RS pattern design, or configure the resource allocation, based on a set of resource-location-based parameters that include at least one of: offset between the lowest frequency index and the starter of RS position (O_f_1), offset between two discrete RS block unit (O_f_2), or number of consecutive RS block unit (N_cb). For example, the transmission node may identify a plurality of reference signal sub-units, each of which consists of one of the patterns. The transmission node may configure, define and/or describe each of the plurality of regions to include the plurality of reference signal sub-units based on at least one of: a number of the reference signal sub-units, an offset between two adjacent ones of the reference signal sub-units along a frequency domain of the resource grid, an offset between two adjacent ones of the reference signal sub-units along a time domain of the resource grid, a number of the reference signal sub-units along the frequency domain of the resource grid, a number of the reference signal sub-units along the time domain of the resource grid, or respective locations of the reference signal sub-units along the time domain of the resource grid. The transmission node may identify an offset between a bottom boundary of a scheduling bandwidth and a starting location of the regions along the frequency domain of the resource grid as a first one of the set of resource-location-based parameters. The transmission node may identify an offset between two non-consecutive, adjacent ones of the regions along the frequency domain of the resource grid as a second one of the set of resource-location-based parameters. The transmission node may identify a number of one or more consecutive ones of the regions along the frequency domain of the resource grid as a third one of the set of resource-location-based parameters.

Figure 7B:
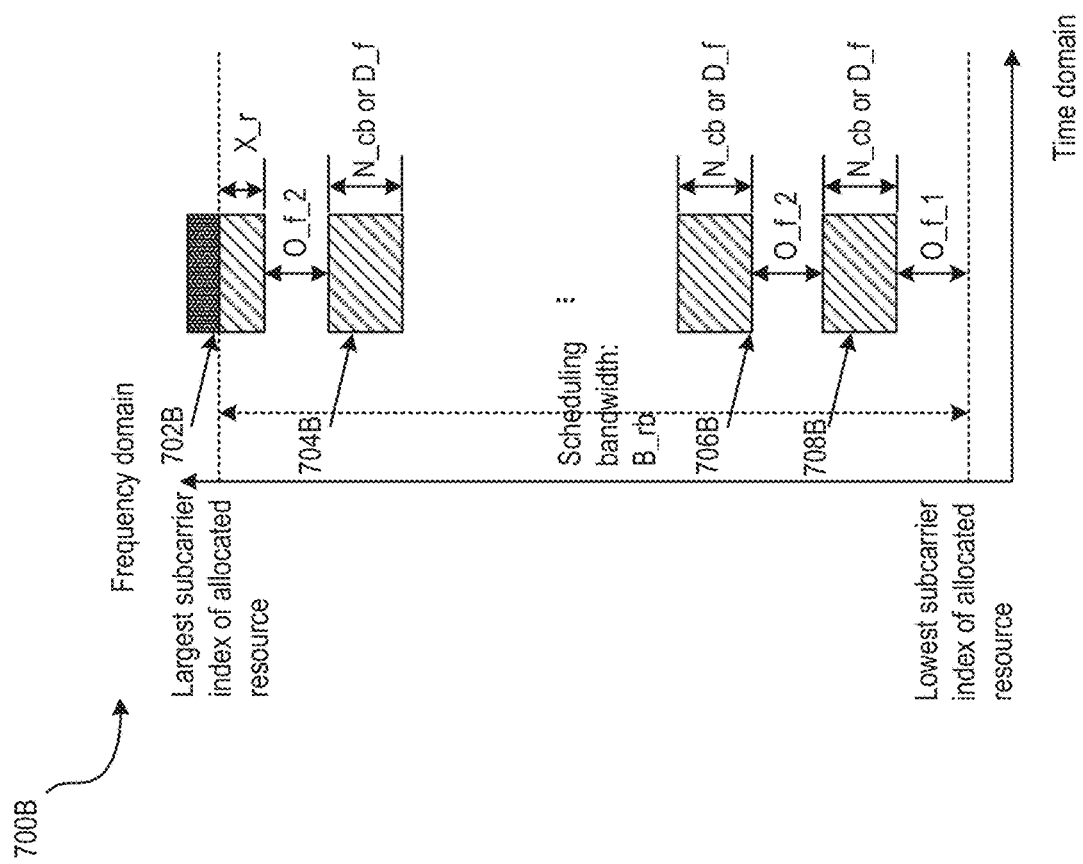
FIG. 7B is an example time-frequency resource grid 700B depicting reference signal (RS) patterns consisting of a plurality of RS block units, in accordance with some embodiments of the present disclosure.

FIG. 7B includes an example time-frequency resource grid 700B depicting reference signal (RS) patterns consisting of a plurality of RS block units (also referred to herein as, "a scheduling unit" and/or "a region"), in accordance with some embodiments of the present disclosure. The time-frequency resource grid 700B includes RS block unit 702B, RS block unit 704B, RS block unit 706B, RS block unit 708B, and RS block unit 710B (collectively referred to as, "RS block unit 702B-710B"). Each RS block unit 702B-710B includes a respective subset of the RS patterns. The time-frequency resource grid 700B depicts the relationship between resource-location-based parameters, such as an offset between the lowest frequency index and the starter of RS position (O_f_1), an offset between two discrete RS block unit (O_f_2), DownSampleFactor (D_f), and the number of consecutive RS block unit (N_cb); and each RS block unit 702B-710B. The time-frequency resource grid 700B also depicts the length of fractional RS (X_r), which is the result of the final RS allocation. In some embodiments, the transmission node may determine that the RS allocation based on the pattern exceeds the region of scheduling bandwidth for certain user equipment (UE). In response to the determination, the transmission node may only transmit the fraction of the unit with length (X_r) crossing the boundary.

Still referring to FIG. 7B, in some embodiments, the transmission node (e.g., BS 102 or UE 104) may determine the RS pattern design, or configure the resource allocation, based on a set of resource-location-based parameters that include at least one of: an offset between the lowest frequency index and the starter of RS position (O_f_1), an offset between two discrete RS block unit (O_f_2), or duration of consecutive RS in frequency domain (D_f, eg D_f RBs). For example, the transmission node may identify an offset between a bottom boundary of a scheduling bandwidth and a starting location of the regions along the frequency domain of the resource grid as a first one of the set of resource-location-based parameter. The transmission node may identify an offset between two non-consecutive, adjacent ones of the regions along the frequency domain of the resource grid as a second one of the set of resource-location-based parameters. The transmission node may identify a length of one or more consecutive ones of the regions along the frequency domain of the resource grid as a third one of the set of resource-location-based parameters.

Figure 8A:
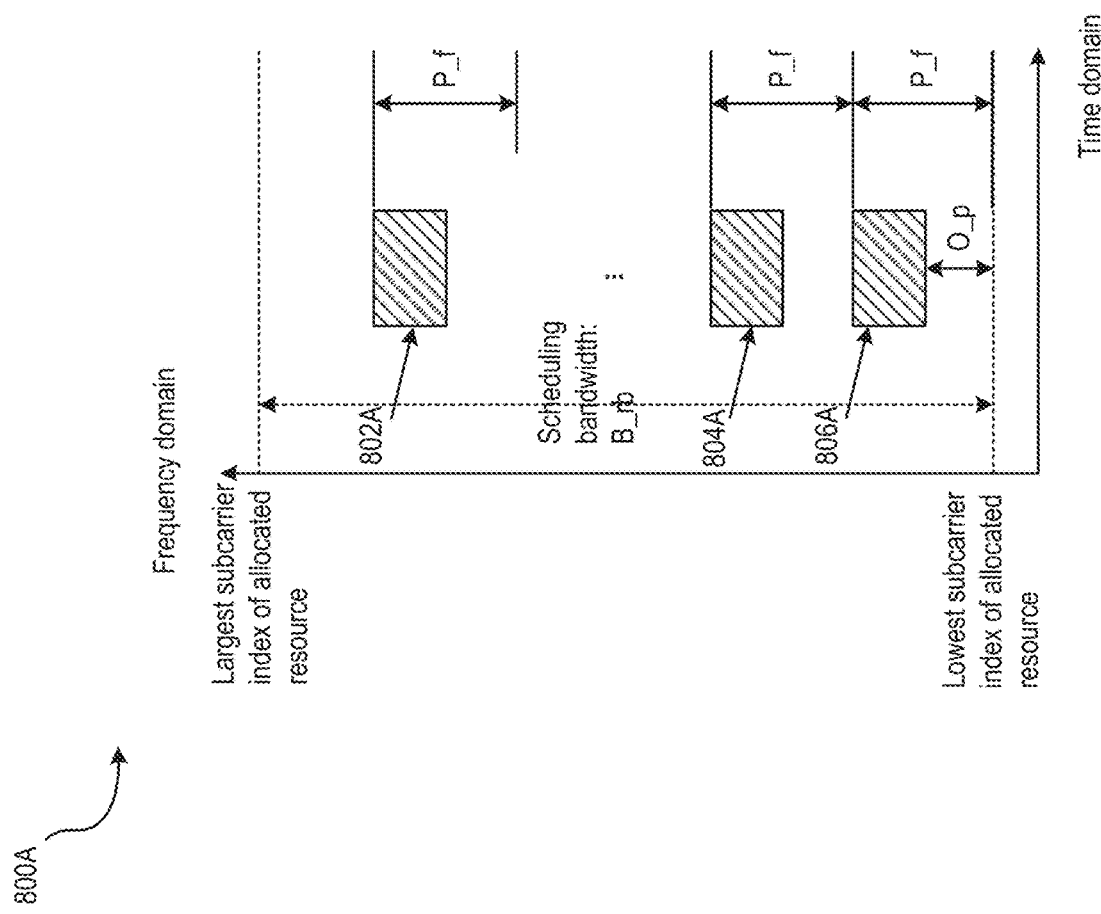
FIG. 8A is an example time-frequency resource grid 800A depicting reference signal (RS) patterns consisting of a plurality of RS block units, in accordance with some embodiments of the present disclosure.

FIG. 8A includes an example time-frequency resource grid 800A depicting reference signal (RS) patterns consisting of a plurality of RS block units (also referred to herein as, "a scheduling unit" and/or "a region"), in accordance with some embodiments of the present disclosure. The time-frequency resource grid 800A includes RS block unit 802A, RS block unit 804A, and RS block unit 806A (collectively referred to as, "RS block unit 802A-806A"). Each RS block unit 802A-806A includes a respective subset of the RS patterns. The time-frequency resource grid 800A depicts the relationship between resource-location-based parameters, such as a periodicity of each DM-RS unit allocation (P_f), an offset within each period (O_p), and the number of consecutive RS block unit (N_cb); and each RS block unit 802A-806A. Within the scheduled bandwidth, the resource allocation for the time-resource grid 800A will be determined in a periodical way, as discussed below.

Figure 8B:
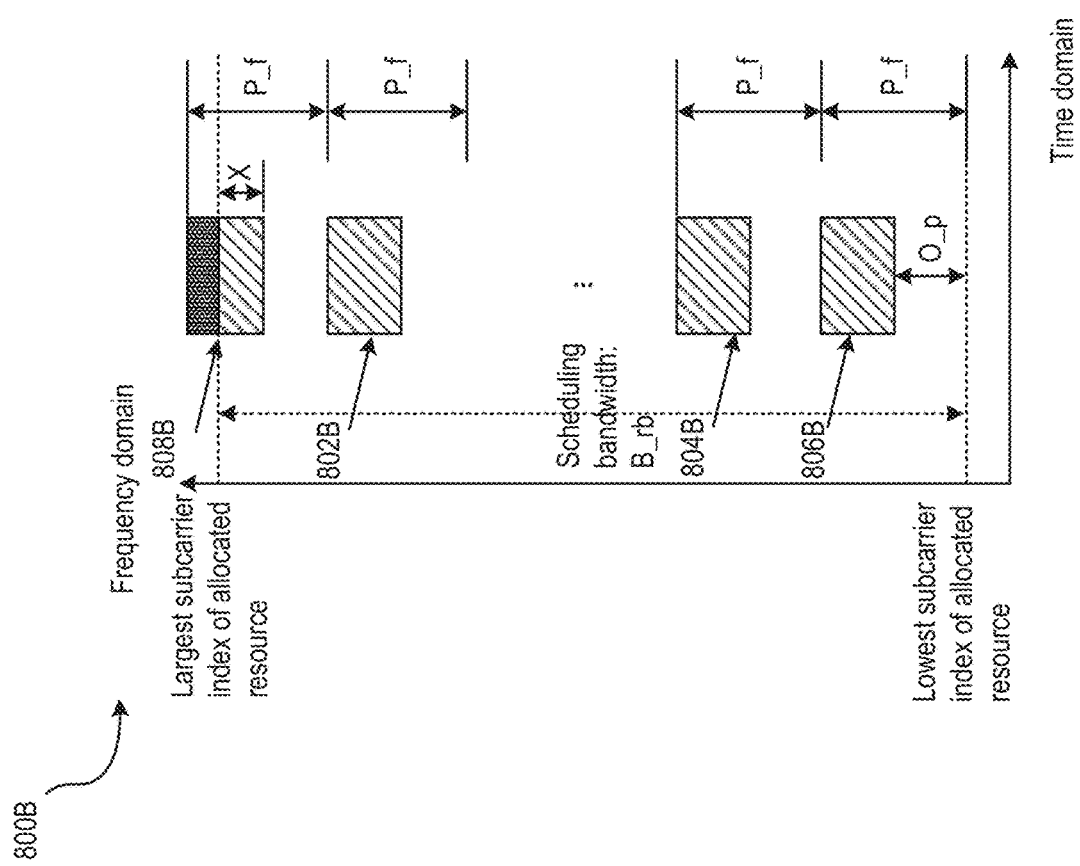
FIG. 8B is an example time-frequency resource grid 800B depicting reference signal (RS) patterns consisting of a plurality of RS block units, in accordance with some embodiments of the present disclosure.

FIG. 8B includes an example time-frequency resource grid 800B depicting reference signal (RS) patterns consisting of a plurality of RS block units (also referred to herein as, "a scheduling unit" and/or "a region"), in accordance with some embodiments of the present disclosure. The time-frequency resource grid 800B includes RS block unit 802B, RS block unit 804B, RS block unit 806B, and RS block unit 808B (collectively referred to as, "RS block unit 802B-808B"). Each RS block unit 802B-808B includes a respective subset of the RS patterns. The time-frequency resource grid 800B depicts the relationship between resource-location-based parameters, such as a periodicity of each DM-RS unit allocation (P_f) and an offset within each period (O_p); and each RS block unit 802B-808B. The time-frequency resource grid 800B also depicts the length of fractional RS (X), which is the result of the final RS allocation. In some embodiments, the transmission node may determine that the RS allocation based on the pattern exceeds the region of scheduling bandwidth for certain user equipment (UE). In response to the determination, the transmission node may only transmit the fraction of the unit with length (X) crossing the boundary. Within the scheduled bandwidth, the resource allocation for the time-resource grid 800B will be determined in a periodical way, as discussed below.

Still referring to FIGS. 8A and 8B, in some embodiments, the transmission node (e.g., BS 102 or UE 104) may determine the RS pattern design, or configure the resource allocation, based on a set of resource-location-based parameters that include at least one of: a periodicity of each DM-RS unit allocation (P_f), an offset within each period (O_p), or a number of consecutive RS block unit (N_cb). For example, the transmission node may identify a periodicity of the regions along a frequency domain of the resource grid as a first one of the set of resource-location-based parameters. The transmission node may identify an offset of each the regions within the periodicity along the frequency domain of the resource grid as a second one of the set of resource-location-based parameters. The transmission node may identify a number of one or more consecutive ones of the regions along the frequency domain of the resource grid as a third one of the set of resource-location-based parameters.

In some embodiments, an additional offset (O_f_1), which refers to the gap between the lowest subcarrier index of scheduled bandwidth and the start of first period for RS allocation (as shown on FIGS. 8A and 8B), can be also introduced by the transmission node to further adjust the starter of first period of RS allocation. In some embodiments, the beginning of the RS allocation (as shown on FIGS. 8A and 8B) will be at the start of each period or the end of RS allocation will be at end of each period.

Figure 9A:
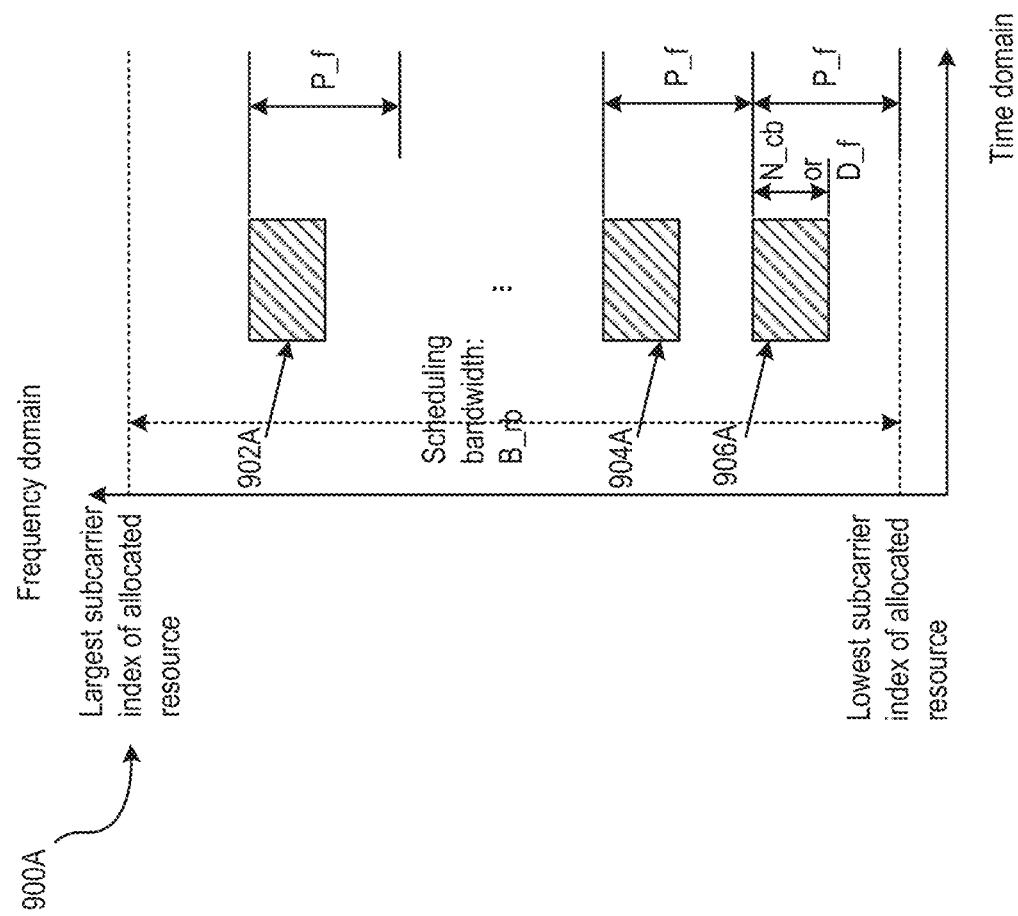
FIG. 9A is an example time-frequency resource grid 900A depicting reference signal (RS) patterns consisting of a plurality of RS block units, in accordance with some embodiments of the present disclosure.

FIG. 9A includes an example time-frequency resource grid 900A depicting reference signal (RS) patterns consisting of a plurality of RS block units (also referred to herein as, "a scheduling unit" and/or "a region"), in accordance with some embodiments of the present disclosure. The time-frequency resource grid 900A includes RS block unit 902A, RS block unit 904A, and RS block unit 906A (collectively referred to as, "RS block unit 902A-906A"). Each RS block unit 902A-906A includes a respective subset of the RS patterns. The time-frequency resource grid 900A depicts the relationship between resource-location-based parameters, such as a periodicity of each DM-RS unit allocation (P_f), the number of consecutive RS block unit (N_cb), and a duration of consecutive RS in frequency domain (D_f, e.g., D_f RBs); and each RS block unit 902A-906A.

Figure 9B:
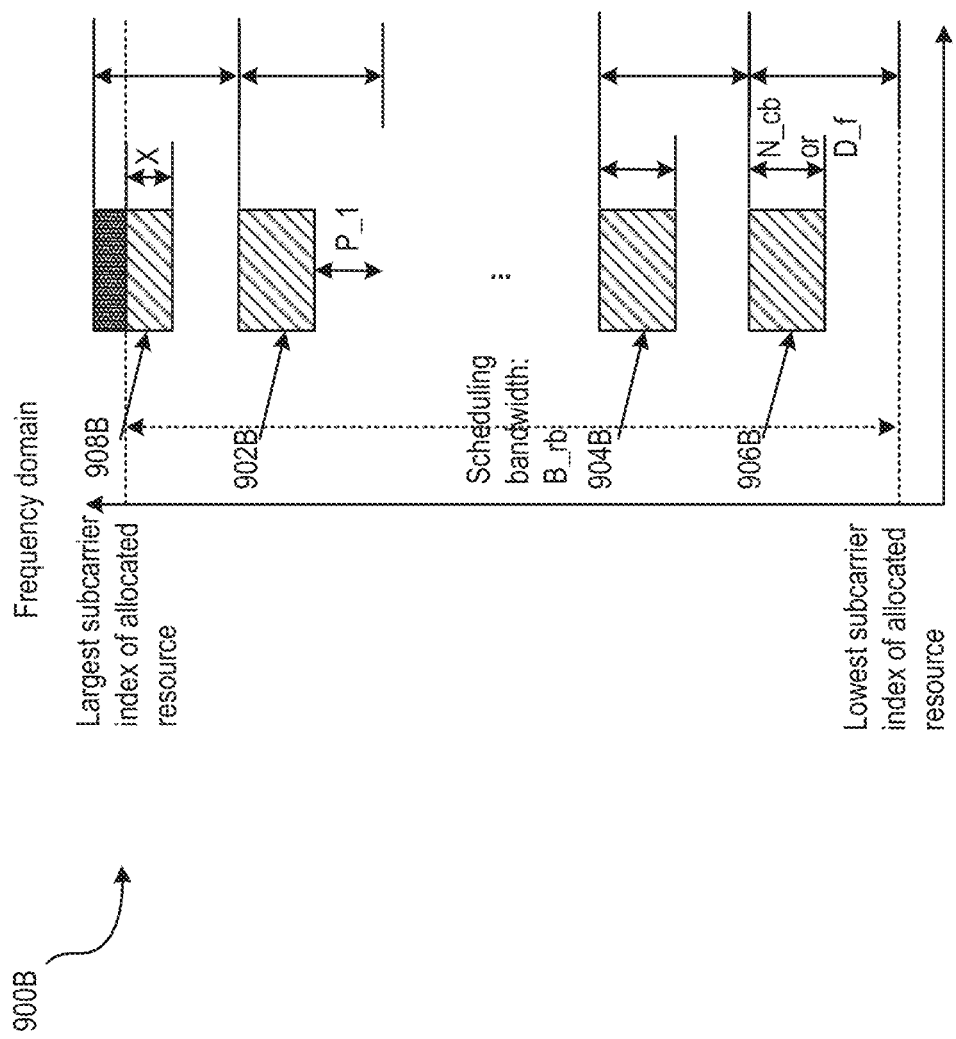
FIG. 9B is an example time-frequency resource grid 900B depicting reference signal (RS) patterns consisting of a plurality of RS block units, in accordance with some embodiments of the present disclosure.

FIG. 9B includes an example time-frequency resource grid 900B depicting reference signal (RS) patterns consisting of a plurality of RS block units (also referred to herein as, "a scheduling unit" and/or "a region"), in accordance with some embodiments of the present disclosure. The time-frequency resource grid 900B includes RS block unit 902B, RS block unit 904B, RS block unit 906B, and RS block unit 908B (collectively referred to as, "RS block unit 902B-908B"). Each RS block unit 902B-908B includes a respective subset of the RS patterns. The time-frequency resource grid 900B depicts the relationship between resource-location-based parameters, such as a periodicity of each DM-RS unit allocation (P_f), an offset within each period (O_p), a number of consecutive RS block unit (N_cb), and a duration of consecutive RS in frequency domain (D_f, e.g., D_f RBs); and each RS block unit 902B-908B. The time-frequency resource grid 900B also depicts the length of fractional RS (X), which is the result of the final RS allocation. In some embodiments, the transmission node may determine that the RS allocation based on the pattern exceeds the region of scheduling bandwidth for certain user equipment (UE). In response to the determination, the transmission node may only transmit the fraction of the unit with length (X) crossing the boundary.

Still referring to FIGS. 9A and 9B, in some embodiments, the transmission node (e.g., BS 102 or UE 104) may determine the RS pattern design, or configure the resource allocation, based on a set of resource-location-based parameters that include at least one of: a periodicity of each DM-RS unit allocation (P_f), or a number of consecutive RS block unit (N_cb). For example, a transmission node may identifying a periodicity of the regions along a frequency domain of the resource grid as a first one of the set of resource-location-based parameters. The transmission node may identify a number of one or more consecutive ones of the regions along the frequency domain of the resource grid as a second one of the set of resource-location-based parameters.

In some embodiments, the transmission node (e.g., BS 102 or UE 104) may determine the RS pattern design, or configure the resource allocation, based on a set of resource-location-based parameters that include at least one of: a periodicity of each DM-RS unit allocation (P_f), or a duration of consecutive RS in frequency domain (D_f, e.g., D_f RBs). For example, a transmission node may identify a periodicity of the regions along a frequency domain of the resource grid as a first one of the set of resource-location-based parameters. The transmission node may identify a length of one or more consecutive ones of the regions along the frequency domain of the resource grid as a second one of the set of resource-location-based parameters.

In some embodiments, an additional offset (O_f_1), which refers to the gap between the lowest subcarrier index of scheduled bandwidth and the start of first period for RS allocation (as shown on FIGS. 9A and 9B), can be also introduced by the transmission node to further adjust the starter of first period of RS allocation. In some embodiments, the beginning of the RS allocation (as shown on FIGS. 9A and 9B) will be at the start of each period or the end of RS allocation will be at end of each period.

Certain limitations for the pattern/resource allocation may exist. In some embodiments, the values that the transmission node assigns (or associates with) to the at least one resource-location-based parameters, as discussed herein, are an integer times (or multiple) of the basic scheduled unit (e.g., resource block group (RBG) size, or physical resource block (PRB) size) to ensure that the allocation of each consecutive RS region can meet (or, satisfy, achieve, match) one or more conditions (or, predetermined thresholds). For example, the transmission node may transmit each of the set of resource-location-based parameters as either a numeric value or a weighting value of a scheduling unit size (e.g., RBG size, or PRB size).

In some embodiments, if the transmission mode determines that the allocated RS exceeds the range of scheduled bandwidth, then the transmission mode may not transmit the excess.

In some embodiments, if the transmission node determines that the region for RS allocation is indexed within the scheduled bandwidth (e.g., matching the resource allocation shown in FIGS. 6A-9B), then the transmission mode does not introduce (use, commute) any additional parameters (e.g., resource-location-based parameters, pattern-based parameters) to define the starter (or start or starting position) of a scheduling bandwidth. In some embodiments, if the transmission node determines that the region for RS allocation is not indexed within the scheduled bandwidth (i.e., not matching the resource allocation shown in FIGS. 6A-9B), then the transmission node introduces (use, commute) at least one additional parameter to define the starter of the scheduling bandwidth.

When defining a reference signal pattern, the transmission node may take into consideration other reference signals, such as phase-tracking reference signal (PTRS). In some embodiments, if the transmission node determines that the allocated frequency position of PTRS is misaligned with the DM-RS allocation, then the transmission node shall not transmit the PTRS with preconfigured allocation. In some embodiments, if the transmission node determines that the allocated frequency position of PTRS is misaligned with the DM-RS allocation, then the transmission node can align the PTRS with preconfigured allocation with the closest position of corresponding DM-RS port which is associated to the PTRS. For example, the transmission node may identify a first one and a second one of the plurality of reference signals as being misaligned in a first one and second one of the regions, respectively, along a frequency domain of the resource grid, the second reference signal associated with the first reference signal. The transmission node may move the first reference signal to one of the regions allocated for the second reference signal that is immediately adjacent to the second region.

Various signaling designs for the indication are contemplated. In some embodiments, signaling via RRC or MAC for single set of parameters may be used. In some embodiments, multiple signaling RRC or MAC corresponding to parameters may be used. For example, the transmission node may transmit to the receiving device the set of pattern-based parameters and the set of resource-location-based parameters via a radio resource control (RRC) message or a medium access control (MAC) message.

In some embodiments, multiple set(s) of parameters may be configured by RRC, where further selection may be done by either MAC CE, or DCI or MAC+DCI. For example, multiple sets of parameters may be distinguished by different frequency density and/or different time domain density, which is controlled by the number of additional DM-RS location. As another example, the transmission node may transmit to the receiving device a plurality of sets of either the pattern-based parameters or the resource-location-based parameters via a radio resource control (RRC) message. The transmission node may transmit to the receiving device a selection between the plurality of sets of either the pattern-based parameters or the resource-location-based parameters via a medium access control (MAC) control element (CE), a downlink control information (DCI) message, or a combination thereof. As another example, the plurality of regions may be separated from one another on the resource grid.

Figure 10:
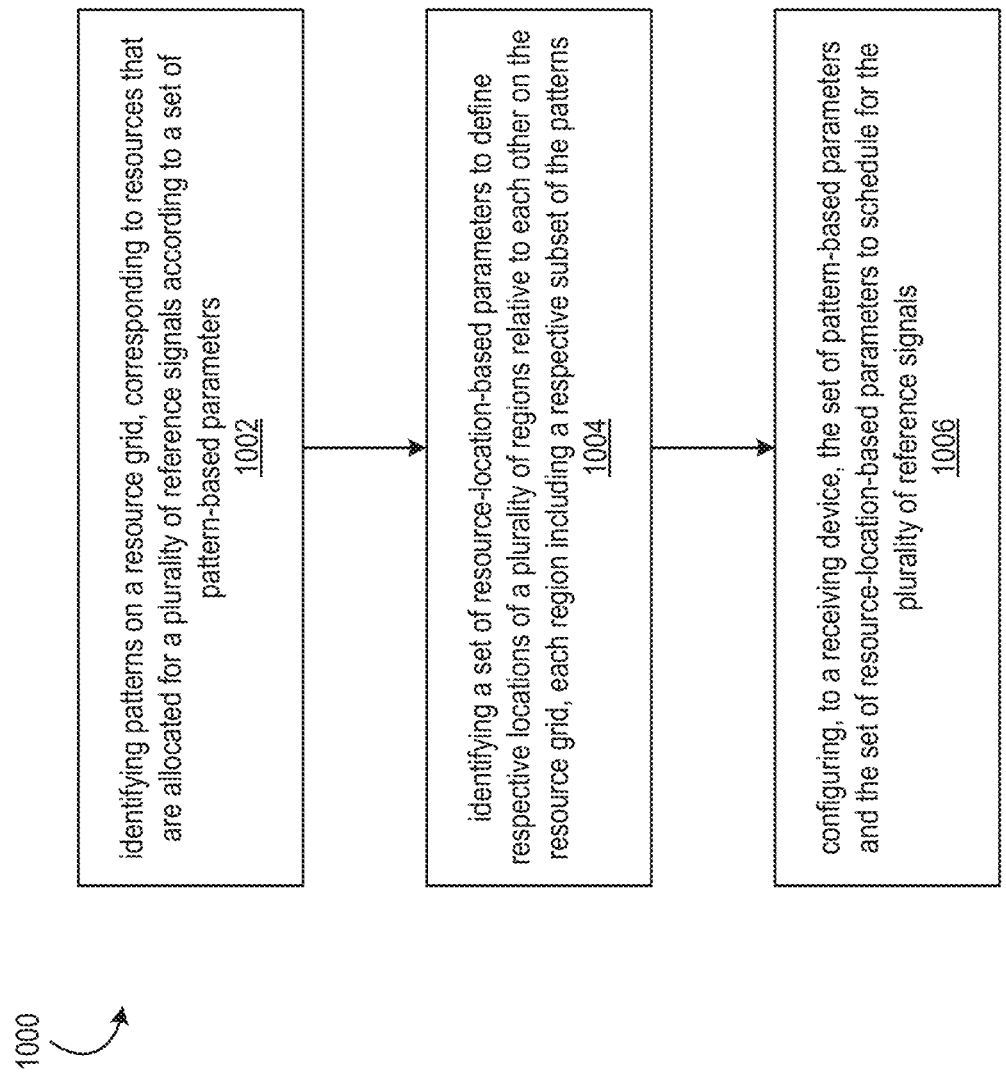
FIG. 10 is a flow diagram depicting a method for reference signaling design and configuration, in accordance with some embodiments of the present disclosure.

FIG. 10 is a flow diagram depicting an example method for reference signaling design and configuration, in accordance with some embodiments of the present disclosure. Additional, fewer, or different operations may be performed in the method depending on the particular embodiment. In some embodiments, some or all operations of method 1000 may be performed by a wireless communication node, such as BS 102 in FIG. 1. In some operations, some or all operations of method 1000 may be performed by a wireless communication device, such as UE 104 in FIG. 1. Each operation may be re-ordered, added, removed, or repeated.

As shown, the method 1000 includes the operation 1002 of identifying patterns on a resource grid, corresponding to resources that are allocated for a plurality of reference signals according to a set of pattern-based parameters. The method also includes the operation 1004 of identifying a set of resource-location-based parameters to define respective locations of a plurality of regions relative to each other on the resource grid, each region including a respective subset of the patterns. The method also includes the operation 1006 of configuring, to a receiving device, the set of pattern-based parameters and the set of resource-location-based parameters to schedule for the plurality of reference signals.

Figure 11:
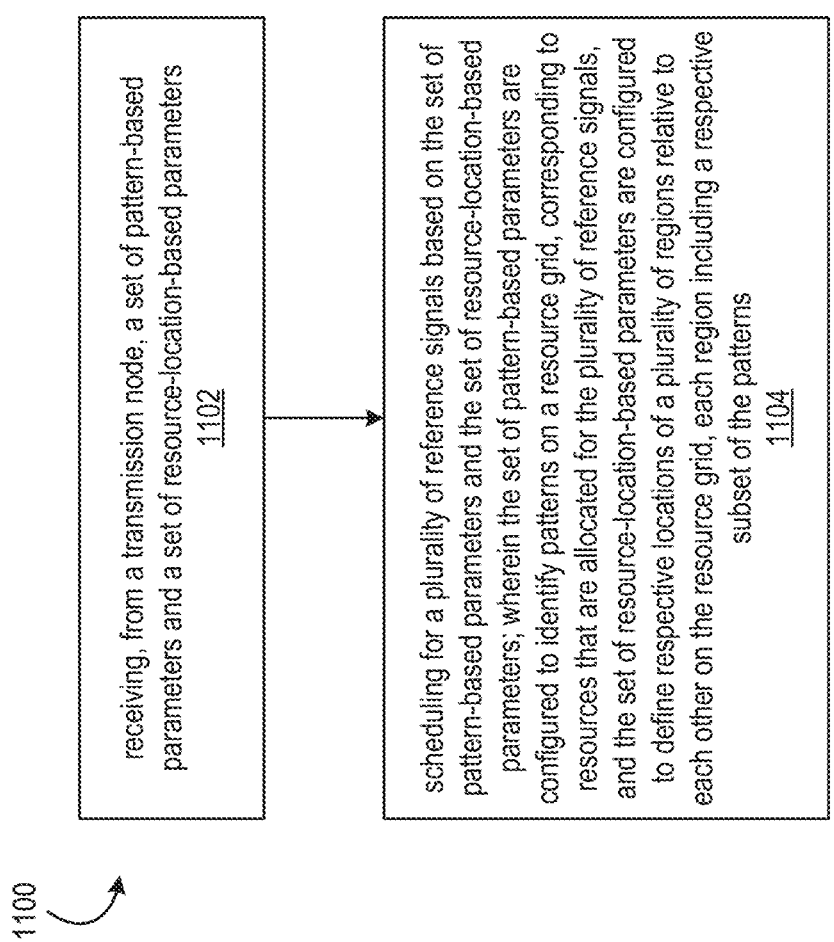
FIG. 11 is a flow diagram depicting a method for reference signaling design and configuration, in accordance with some embodiments of the present disclosure.

FIG. 11 is a flow diagram depicting an example method for reference signaling design and configuration, in accordance with some embodiments of the present disclosure. Additional, fewer, or different operations may be performed in the method depending on the particular embodiment. In some embodiments, some or all operations of method 1100 may be performed by a wireless communication node, such as BS 102 in FIG. 1. In some operations, some or all operations of method 1100 may be performed by a wireless communication device, such as UE 104 in FIG. 1. Each operation may be re-ordered, added, removed, or repeated.

As shown, the method 1100 includes the operation 1102 of receiving a set of pattern-based parameters and a set of resource-location-based parameters. The method also includes the operation 1104 of scheduling for a plurality of reference signals based on the set of pattern-based parameters and the set of resource-location-based parameters, wherein the set of pattern-based parameters are configured to identify patterns on a resource grid, corresponding to resources that are allocated for the plurality of reference signals, and the set of resource-location-based parameters are configured to define respective locations of a plurality of regions relative to each other on the resource grid, each region including a respective subset of the patterns.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
    identifying, by a transmission node, patterns on a resource grid, corresponding to resources that are allocated for a plurality of reference signals according to a set of pattern-based parameters;
    identifying, by the transmission node, a set of resource-location-based parameters to define respective locations of a plurality of regions relative to each other on the resource grid, each region including a respective subset of the patterns;
    identifying, by the transmission node, a plurality of reference signal sub-units on the resource grid, each of which includes one of the patterns;
    defining, by the transmission node, each of the plurality of regions to include the plurality of reference signal sub-units based on a number of the reference signal sub-units and an offset between two adjacent ones of the reference signal sub-units along a frequency domain of the resource grid;
    identifying, by the transmission node, the number of the reference signal sub-units and the offset between two adjacent ones of the reference signal sub-units along the frequency domain of the resource grid as the set of resource-location-based parameters; and
    configuring, to a receiving device, the set of pattern-based parameters and the set of resource-location-based parameters to schedule for the plurality of reference signals.

2. The method of claim 1, wherein the set of pattern-based parameters include at least one of: a number of code division multiplexing (CDM) groups, an orthogonal cover code (OCC) in a time domain used for CDM, an OCC in a frequency domain used for CDM, and a cyclic shift (CS) used for CDM, a resource signal (RS)-type.

3. The method of claim 1, further comprising:
    identifying one or more reference signal sub-units on the resource grid, each of the one or more reference signal sub-units includes one of the patterns;
    defining each of the plurality of regions to include the one or more reference signal sub-units based on determining whether a number of the one or more reference signal sub-units is one or whether the one or more reference signal sub-units are consecutive along the frequency domain of the resource grid;
    identifying, based on the determination, the number of the reference signal sub-units as the set of resource-location-based parameters.

4. The method of claim 1, further comprising:
    defining each of the plurality of regions to include the plurality of reference signal sub-units based on a number of the reference signal sub-units along a frequency domain of the resource grid, a number of the reference signal sub-units along a time domain of the resource grid, the offset between two adjacent ones of the reference signal sub-units along the frequency domain of the resource grid, and respective locations of the reference signal sub-units along the time domain of the resource grid; and
    identifying the number of the reference signal sub-units along the frequency domain of the resource grid, the number of the reference signal sub-units along the time domain of the resource grid, the offset between two adjacent ones of the reference signal sub-units along the frequency domain of the resource grid, and the respective locations of the reference signal sub-units along the time domain of the resource grid as the set of resource-location-based parameters.

5. The method of claim 4, wherein the plurality of reference signal sub-units are consecutive along the frequency domain of the resource grid, the method further comprising:
identifying the number of the reference signal sub-units along the frequency domain of the resource grid, the number of the reference signal sub-units along the time domain of the resource grid, and the respective locations of the reference signal sub-units along the time domain of the resource grid as the set of resource-location-based parameters.

6. The method of claim 1, further comprising:
identifying a granularity factor as the set of resource-location-based parameters, wherein the granularity factor is equal to a length of each of the regions along a frequency domain of the resource grid, and the granularity factor is equal to a distance between adjacent ones of the regions along the frequency domain of the resource grid.

7. The method of claim 1, further comprising:
identifying a granularity factor as a first one of the set of resource-location-based parameters, wherein the granularity factor is equal to a length of each of the regions along a frequency domain of the resource grid, and the granularity factor is equal to a distance between adjacent ones of the regions along the frequency domain of the resource grid; and
identifying an offset between a bottom boundary of a scheduling bandwidth and a starting location of the regions along the frequency domain of the resource grid as a second one of the set of resource-location-based parameters.

8. The method of claim 1, further comprising:
identifying a granularity factor as a first one of the set of resource-location-based parameters, wherein the granularity factor is equal to a length of each of the regions along a frequency domain of the resource grid, and the granularity factor is equal to a distance between adjacent ones of the regions along the frequency domain of the resource grid;
dividing, using the granularity factor, a scheduling bandwidth into a plurality of sections;
generating a bitmap to indicate which of the sections is allocated for one of the reference signals; and
identifying the bitmap as a second one of the set of resource-location-based parameters.

9. The method of claim 1, wherein the set of pattern-based parameters include a down sample factor configured to enlarge a number of resource units across which each of the patterns is distributed along a frequency domain of the resource grid.

10. The method of claim 1, further comprising:
identifying a plurality of reference signal sub-units, each of which consists of one of the patterns;
defining each of the plurality of regions to include the plurality of reference signal sub-units based on at least one of: the number of the reference signal sub-units, the offset between two adjacent ones of the reference signal sub-units along the frequency domain of the resource grid, an offset between two adjacent ones of the reference signal sub-units along a time domain of the resource grid, a number of the reference signal sub-units along the frequency domain of the resource grid, a number of the reference signal sub-units along the time domain of the resource grid, and respective locations of the reference signal sub-units along the time domain of the resource grid;
identifying an offset between a bottom boundary of a scheduling bandwidth and a starting location of the regions along the frequency domain of the resource grid as a first one of the set of resource-location-based parameters;
identifying an offset between two non-consecutive, adjacent ones of the regions along the frequency domain of the resource grid as a second one of the set of resource-location-based parameters; and
identifying a number of one or more consecutive ones of the regions along the frequency domain of the resource grid as a third one of the set of resource-location-based parameters.

11. The method of claim 1, further comprising:
identifying an offset between a bottom boundary of a scheduling bandwidth and a starting location of the regions along the frequency domain of the resource grid as a first one of the set of resource-location-based parameters;
identifying an offset between two non-consecutive, adjacent ones of the regions along the frequency domain of the resource grid as a second one of the set of resource-location-based parameters; and
identifying a length of one or more consecutive ones of the regions along the frequency domain of the resource grid as a third one of the set of resource-location-based parameters.

12. The method of claim 1, further comprising:
identifying a periodicity of the regions along a frequency domain of the resource grid as a first one of the set of resource-location-based parameters;
identifying an offset of each the regions within the periodicity along the frequency domain of the resource grid as a second one of the set of resource-location-based parameters; and
identifying a number of one or more consecutive ones of the regions along the frequency domain of the resource grid as a third one of the set of resource-location-based parameters.

13. The method of claim 1, further comprising:
identifying a periodicity of the regions along a frequency domain of the resource grid as a first one of the set of resource-location-based parameters; and
identifying a number of one or more consecutive ones of the regions along the frequency domain of the resource grid as a second one of the set of resource-location-based parameters.

14. The method of claim 1, further comprising:
identifying a periodicity of the regions along a frequency domain of the resource grid as a first one of the set of resource-location-based parameters; and
identifying a length of one or more consecutive ones of the regions along the frequency domain of the resource grid as a second one of the set of resource-location-based parameters.

15. The method of claim 1, further comprising:
transmitting each of the set of resource-location-based parameters as either a numeric value or a weighting value of a scheduling unit size.

16. The method of claim 1, further comprising:
identifying a first one and a second one of the plurality of reference signals as being misaligned in a first one and second one of the regions, respectively, along a frequency domain of the resource grid, the second reference signal associated with the first reference signal; and moving the first reference signal to one of the regions, allocated for the second reference signal, that is immediately adjacent to the second region.

17. The method of claim 1, further comprising:
transmitting to the receiving device the set of pattern-based parameters and the set of resource-location-based parameters via a radio resource control (RRC) message or a medium access control (MAC) message.

18. A method, comprising:
receiving, from a transmission node, a set of pattern-based parameters and a set of resource-location-based parameters; and
scheduling for a plurality of reference signals based on the set of pattern-based parameters and the set of resource-location-based parameters,
wherein the set of pattern-based parameters are configured to identify patterns on a resource grid, corresponding to resources that are allocated for the plurality of reference signals, and the set of resource-location-based parameters are configured to define respective locations of a plurality of regions relative to each other on the resource grid, each region including a respective subset of the patterns,
wherein a plurality of reference signal sub-units on the resource grid are identified, each of which includes one of the patterns, and each of the plurality of regions is defined to include the plurality of reference signal sub-units based on a number of the reference signal sub-units and an offset between two adjacent ones of the reference signal sub-units along a frequency domain of the resource grid, and the number of the reference signal sub-units and the offset between two adjacent ones of the reference signal sub-units along the frequency domain of the resource grid are identified as the set of resource-location-based parameters.

19. A transmission node, comprising:
at least one processor configured to:
identify patterns on a resource grid, corresponding to resources that are allocated for a plurality of reference signals according to a set of pattern-based parameters;
identify a set of resource-location-based parameters to define respective locations of a plurality of regions relative to each other on the resource grid, each region including a respective subset of the patterns;
identify a plurality of reference signal sub-units on the resource grid, each of which includes one of the patterns;
define each of the plurality of regions to include the plurality of reference signal sub-units based on a number of the reference signal sub-units and an offset between two adjacent ones of the reference signal sub-units along a frequency domain of the resource grid;
identify the number of the reference signal sub-units and the offset between two adjacent ones of the reference signal sub-units along the frequency domain of the resource grid as the set of resource-location-based parameters; and
configure, to a receiving device, the set of pattern-based parameters and the set of resource-location-based parameters to schedule for the plurality of reference signals.

\* \* \* \* \*